(12) United States Patent
Wang (10) Patent No.: US 6,459,369 B1
(45) Date of Patent: Oct. 1, 2002

(54) TIRE DEFLATION DETECTION SYSTEM WITH FEEDBACK COMPONENT

(75) Inventor: Orson Szu-Han Wang, Ann Arbor, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/718,326

(22) Filed: Nov. 22, 2000

(51) Int. Cl.⁷ .............................................. G08B 29/00
(52) U.S. Cl. ...................... 340/506; 340/442; 340/443; 340/444; 340/438; 73/146; 116/34 R
(58) Field of Search ................................ 340/506, 442, 340/443, 444, 438; 73/146; 116/34 R (56) References Cited

U.S. PATENT DOCUMENTS

| | | |
|---|---|---|
| 4,876,528 A | 10/1989 | Walker et al. |
| 4,978,941 A | 12/1990 | Brown |
| 5,192,929 A | 3/1993 | Walker et al. |
| 5,239,469 A | 8/1993 | Walker et al. |
| 5,248,957 A | 9/1993 | Walker et al. |
| 5,252,946 A | 10/1993 | Walker et al. |
| 5,345,217 A | 9/1994 | Prottey |
| 5,442,331 A | 8/1995 | Kishimoto et al. |
| 5,483,220 A | 1/1996 | Kushimoto et al. |
| 5,524,482 A | 6/1996 | Kushimoto et al. |
| 5,541,573 A | 7/1996 | Jones |
| 5,552,760 A | 9/1996 | Jones |
| 5,561,415 A | 10/1996 | Dieckmann |
| 5,578,984 A | 11/1996 | Nakajima |
| 5,589,815 A | 12/1996 | Nishihara et al. |
| 5,589,816 A | 12/1996 | Jones |
| 5,591,906 A | 1/1997 | Okawa et al. |
| 5,604,307 A | 2/1997 | Iida et al. |
| 5,619,111 A | 4/1997 | Katagiri et al. |
| 5,629,478 A | 5/1997 | Nakajima et al. |
| 5,691,694 A | * 11/1997 | Horie .......................... 340/442 |
| 5,710,539 A | 1/1998 | Iida |
| 5,721,374 A | 2/1998 | Siekkinen et al. |
| 5,721,528 A | * 2/1998 | Boesch et al. ............... 340/442 |

(List continued on next page.)

FOREIGN PATENT DOCUMENTS

| | | |
|---|---|---|
| CA | 2093167 | 10/1993 |
| EP | 0 657 314 A | 6/1995 |
| EP | 0 786 362 A | 7/1997 |
| EP | 0 787 606 A | 8/1997 |
| EP | 0 802 074 A | 10/1997 |
| EP | 0 826 525 A | 3/1998 |
| EP | 0 826 968 A | 3/1998 |
| EP | 0 832 767 A | 4/1998 |
| EP | 0 872 362 A | 10/1998 |
| EP | 0 872 363 A | 10/1998 |

*Primary Examiner*—Jeffery Hofsass
*Assistant Examiner*—Daniel Previl
(74) *Attorney, Agent, or Firm*—Michael Best & Friedrich LLP (57) ABSTRACT

A system for detecting a deflated tire on a vehicle. The system includes an evaluating process that determines when a tire is likely to be deflated and issues a warning when the evaluating process determines a tire is likely to be deflated. The system further includes a feedback component that provides feedback to the evaluating process indicating whether the issued warning was erroneous. In one aspect of the invention, the feedback component makes corrections to the evaluating process. In another aspect of the invention, the feedback component is a direct feedback component. In yet another aspect of the invention, the feedback component is an inferred feedback component.

26 Claims, 6 Drawing Sheets

U.S. PATENT DOCUMENTS

| | | |
|---|---|---|
| 5,724,266 A | 3/1998 | Kishimoto et al. |
| 5,734,319 A | 3/1998 | Stephens et al. |
| 5,747,686 A | 5/1998 | Nishihara et al. |
| 5,748,076 A | 5/1998 | Horie |
| 5,760,682 A | 6/1998 | Liu et al. |
| 5,771,480 A | 6/1998 | Yanase |
| 5,783,991 A | 7/1998 | Jones |
| 5,826,207 A | 10/1998 | Ohashi et al. |
| 5,828,975 A | 10/1998 | Isshiki et al. |
| 5,838,230 A | 11/1998 | Jones |
| 5,844,475 A | 12/1998 | Horie |
| 5,866,812 A | 2/1999 | Nishihara et al. |
| 5,907,097 A | 5/1999 | Nakajima |
| 5,929,756 A | 7/1999 | Randazzo et al. |
| 5,936,519 A | 8/1999 | Nakajima et al. |
| 5,939,626 A * | 8/1999 | Tominaga et al. .......... 340/444 |
| 5,940,781 A | 8/1999 | Nakajima |
| 6,002,327 A | 12/1999 | Boesch et al. |
| 6,043,737 A * | 3/2000 | Shehan et al. .............. 340/342 |
| 6,118,369 A * | 9/2000 | Boesch ....................... 340/443 |

\* cited by examiner

TIRE DEFLATION DETECTION SYSTEM WITH FEEDBACK COMPONENT

FIELD OF THE INVENTION

The invention relates to tire deflation detection systems, and more particularly to methods of improving the accuracy of tire deflation detection systems.

BACKGROUND OF THE INVENTION

Tire deflation detection systems are well-known for determining when the air pressure in a vehicle's tire has fallen below a predetermined point. There are numerous methods available to detect tire deflation, most of which use the wheel speed sensors that have been placed at each wheel in conjunction with anti-lock brake systems (ABS). The wheel speed sensors collect wheel speed data that can be processed by any number of algorithms designed to determine when one of the tires on the vehicle has become deflated. When a deflated tire is detected, a warning is issued to the driver.

As deflation detection systems have developed, they have become more and more accurate under a wider variety of driving conditions. Great efforts have been made to refine and improve the algorithms to increase the extent of their applicability. While the occurrence of false warnings is going down, the design limitations in the detection algorithms make it impossible to account for every possible driving condition, and therefore impossible to completely eliminate false warnings. False warnings, or the indication of a deflated tire when no tire is actually deflated, are annoying and frustrating to drivers. When a false warning occurs, the driver will check the tire pressure, determine that no deflation exists, and decide that the system has issued a false warning. If this occurrence is allowed to repeat, the driver may eventually ignore all future warnings, anticipating the needless inconvenience due to the perceived random behavior of the system. Eventually the driver could ignore a proper warning. Disregard for a proper warning could have potentially dangerous consequences.

Drivers are often unaware of the technology used in these deflation detection systems and have little or no understanding of how the systems operate. The drivers do not appreciate the engineering trade-offs built into the detection algorithms. These trade-offs define the particular strengths and weaknesses of the detection algorithm. Most false warnings occur for a reason, but those reasons are not usually evident to the driver.

For example, most deflation detection systems include a calibration portion of the algorithm that runs prior to the actual detection portion of the algorithm. During calibration, the system is "learning" the baseline for the variables that impact the measured wheel speeds. The calibration portion of the algorithm characterizes the tires with respect to inflation pressure, specific tire model, and manufacturing variations. These variables are influenced by the driving conditions experienced during calibration. Specifically, the road conditions and the amount of vehicle maneuvering during calibration will influence the calibration values obtained. The calibration process typically occurs after the system is reset, indicating that the driver believes that all of the tires are normally inflated.

Once the calibration process is completed, the calibration values are stored and used as benchmarks or as correction factors. From that time on, the wheel speeds are evaluated against this benchmark, or the correction factors are applied to the current wheel speeds. If the usage of the vehicle or the driving conditions remain substantially constant between the calibration process and the actual deflation detection process, the deflation detection system should operate properly.

If, however, the usage of the vehicle or the driving conditions change between the calibration process and the actual deflation detection process, the system will be susceptible to issuing false warnings. Examples of some of the scenarios that would tend to trigger false warnings are non-uniform loading of the vehicle, usage of non-OEM (Original Equipment Manufacturer) or non-recommended tires having different characteristics than OEM tires, mixed tire configurations (i.e., snow tires on one axle and summer tires on the other axle), usage of tire chains, and sun loading on one side of the vehicle.

Extreme driving conditions, such as high speed driving, driving under high accelerative forces (i.e., uphill driving), and severe vehicle maneuvering also pose problems for most deflation detection systems. In the past, detection algorithms have simply filtered out data collected under extreme driving conditions, but for newer systems that attempt to account for these conditions, false warnings can still occur.

SUMMARY OF THE INVENTION

Prior art deflation detection systems are open-loop, meaning that there is no feedback available to determine whether a warning was issued improperly. Additionally in open-loop systems, there is no way of preventing a previously issued improper warning from being issued again in the future. Once the prior art systems are reset, the open-loop programming of the algorithms make them prone to making the same errors and misjudgments again and again.

The present invention mitigates the annoyance of repeated erroneous warnings by providing a method of using driver feedback to determine whether a warning was properly issued. If it is determined that the warning was improper, adjustments are made to the algorithm to help prevent the same improper warning from issuing again in the future. The method of the present invention includes a feedback loop that can be designed into virtually any new deflation detection system or can be added on to virtually any existing system. By making the system a closed-loop system, it is possible to greatly reduce or eliminate the repeated occurrence of false warnings.

With the current invention, the decision to issue a warning may be incorrect once, but after that incident, the deflation detection algorithm will have feedback that the previous judgment was incorrect Future detection decisions can be modified to avoid repeating the false warning under similar circumstances. The exact action to take will vary depending on the deflation detection algorithm, but in many cases, the sensitivity of the detection algorithm can be reduced by modifying either the deflation detection threshold value or the signal values being compared to the threshold value.

The preferred embodiment of the present invention utilizes an inferred feedback component to determine whether a warning was properly or improperly issued. The preferred embodiment compares pre-warning signals, collected prior to the issuance of the warning, with post-warning signals, collected after the system has been reset, to determine whether the warning was proper. The comparison sheds light on whether corrective action was actually taken by the driver, or whether the driver checked the tires, found no actual deflation, and pushed the reset button to reset the system. In the case where the driver found no actual deflation, the present invention assumes that the warning was erroneous (due to some atypical usage of the vehicle not accounted for in the algorithm) and then makes a correction to the algorithm to prevent the repeated erroneous warning in the future.

The inferred feedback component also attempts to determine whether the driver actually checked for a deflation after a warning was issued. Modern vehicles are equipped with numerous features that can be used by the present invention to indirectly determine whether the driver acknowledged the issued warning and took action to check the tires. Determining whether the vehicle came to a complete stop, whether the transmission was shifted into park, whether the parking brake was set, whether the ignition was turned off, and whether the driver's door was opened and closed are just a few of the determinations that can be useful for the present invention.

In an alternative embodiment, the invention can utilize a direct feedback component, which relies on direct driver input to determine whether a warning was properly issued. In this embodiment, the driver must directly communicate with the tire deflation detection system by selecting the appropriate button or signal device to let the detection system know if the warning was proper or erroneous.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
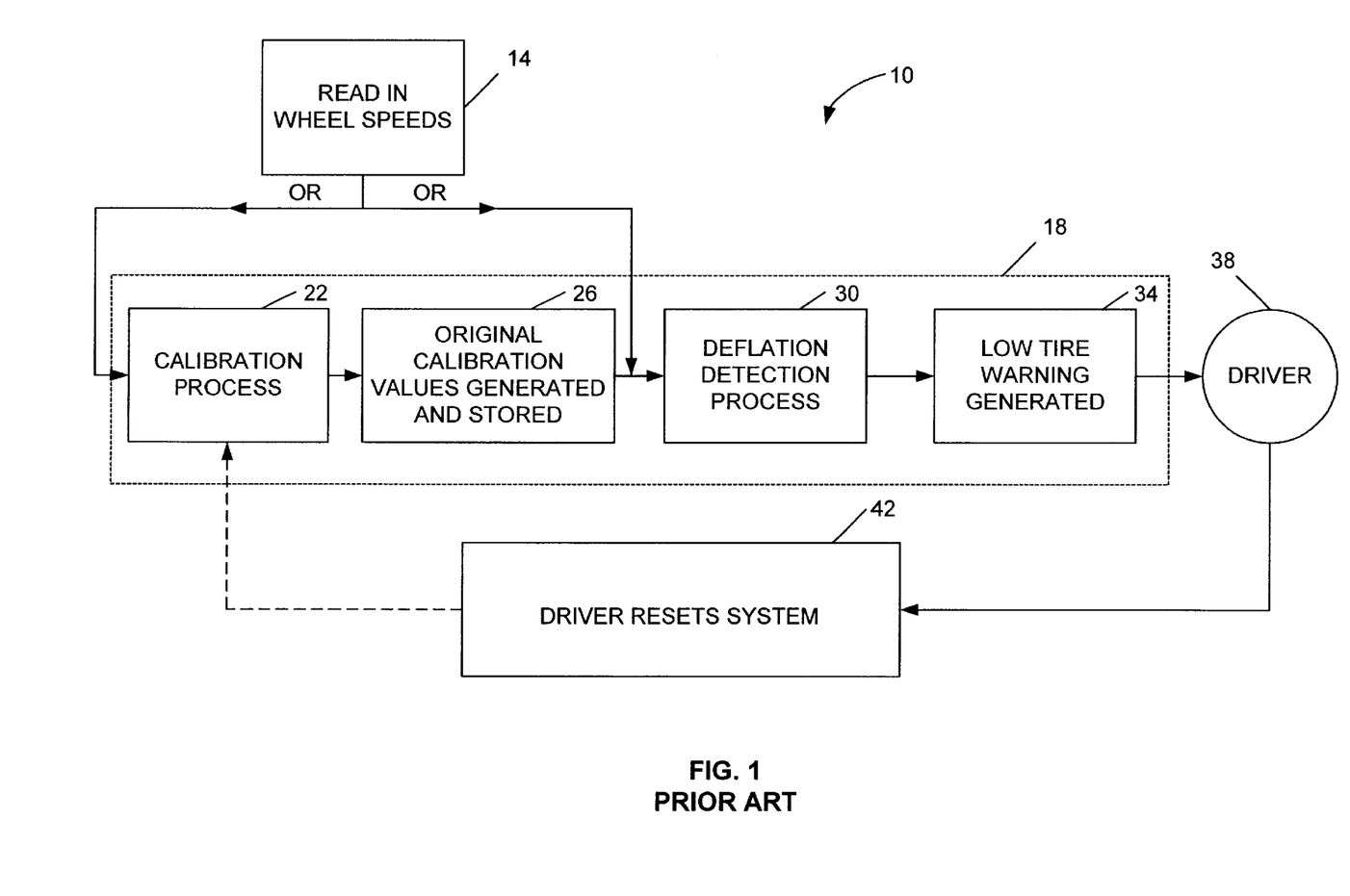
FIG. 1 is a flow chart representing a prior art tire deflation detection system.

FIG. 1 illustrates a flow chart depicting the general operation of most prior art tire deflation detection systems 10. During operation of the prior art system 10, wheel speeds are read in (block 14) from the wheel speed sensors at one or more of the wheels at regular sampling intervals. The wheel speeds are manipulated by a deflation detection evaluation process (typically an algorithm), generally represented by the box 18.

There are numerous different evaluation processes 18 in the prior art, each of which manipulates the wheel speeds in different manners to determine when the tires of the vehicle are likely to be deflated. As used herein, the term "evaluation process" is meant to include any known or yet-to-be-known evaluation process capable of determining whether a tire on a vehicle is likely to be deflated. Most existing evaluation processes 18 include common components. For example, most evaluation processes 18 include some form of a calibration process (block 22) that characterizes the tires with respect to inflation pressure, specific tire model, and manufacturing variations. The calibration process 22 typically generates and stores original calibration values (block 26) that are used as a benchmark or as a correction factor for the individual wheel speeds. From this time on, the wheel speeds are evaluated against this benchmark, or the correction factor is applied to the current wheel speeds.

Once the original calibration values have been generated, the calibration steps (blocks 22 and 26) are bypassed (as indicated by the OR between block 14 and block 22 and the OR between block 14 and block 30) and the evaluation process 18 proceeds with a deflation detection process (block 30), which performs the mathematical processing, including the use of the original calibration values, to determine whether a tire is likely to be deflated. The deflation detection process 30 typically generates a final deflation signal that is somehow compared to a predetermined threshold value. If the final deflation signal crosses this predetermined threshold value, a tire is determined likely to be deflated. Again, the actual method of mathematical processing used by the deflation detection process 30 depends upon the specific prior art detection system 10 being used. The specific form of the final deflation signal and the predetermined threshold value will vary with different deflation detection processes 30. The specifics of the calibration process 22 are also determined by the specific deflation detection process 30 being used.

If the deflation detection process 30 determines that a tire is likely to be deflated, a low tire warning is generated (block 34) in the passenger compartment (usually on the dashboard) to alert a driver or a vehicle occupant 38 of a potentially deflated tire. The duty to check for an actual deflated tire then passes to the driver 38. Whether the driver 38 determines that there is no actual tire deflation, or takes action to correct an actual deflated tire, he will eventually reset the detection system 10 by actuating some form of a reset button or switch (block 42) and the detection system 10 starts over. When starting over, the detection algorithm 18 returns to the calibration process 22 to re-characterize the tires after corrective action has presumably been taken.

Figure 2:
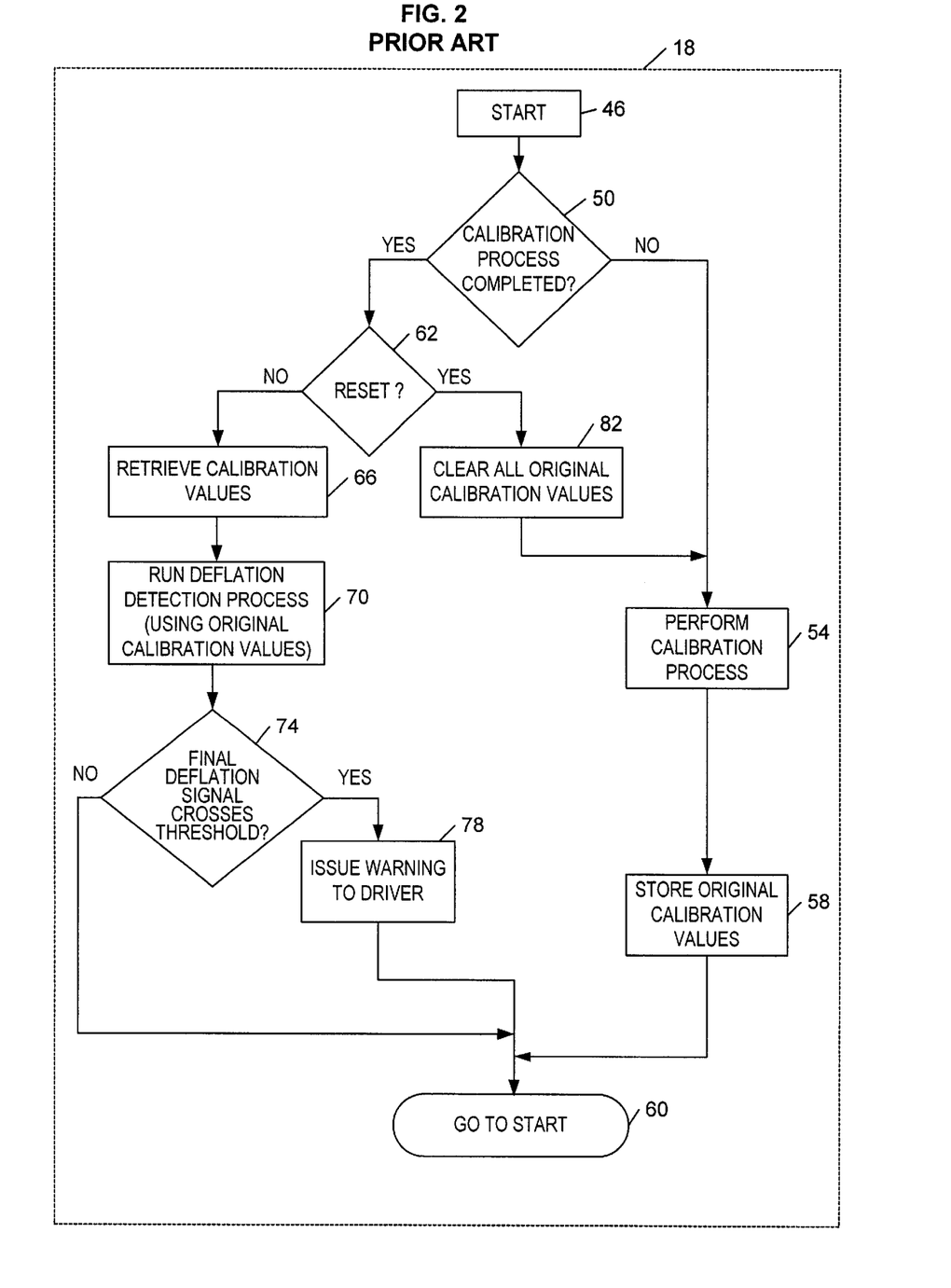
FIG. 2 is a flow chart illustrating in more detail the deflation detection algorithm used in the prior art tire deflation detection system of FIG. 1.

FIG. 2 illustrates the operation of the prior art evaluation process 18 in greater detail. With the wheel speed values read in (see block 14 in FIG. 1), the evaluation process 18 is ready to start (block 46). First, the evaluation process 18 checks to see whether the calibration process 22 has been completed (block 50). If the calibration process 22 has not yet been completed, the evaluation process 18 proceeds to perform the calibration process 22 (block 54). With the calibration process 22 complete, the evaluation process 18 stores the original calibration values (block 58) for use in the deflation detection process 30 and returns to start (block 60).

Since the calibration process 22 is now complete, the answer at block 50 to whether the calibration process 22 is complete is "YES." The evaluation process 18 then asks whether the system 10 has been reset (block 62). When the system has not been reset, the evaluation process 18 proceeds to retrieve the original calibration values (block 66) and run the deflation detection process 30 using the retrieved original calibration values (block 70). The deflation detection process 30 determines whether the final deflation signal crosses a predetermined threshold value (block 74), which would indicate whether or not a tire is likely to be deflated. If no deflation is likely, the evaluation process 18 proceeds to start (block 60) and continues monitoring for likely deflations. If a deflation is likely, the evaluation process 18 issues a warning to the driver (block 78) and returns to start (block 60).

After a warning has been issued, the driver 38 will eventually reset the system 10. The system 10 continues to monitor. When the evaluation process 18 asks whether the system 10 has been reset (block 62), and the answer is "YES," the evaluation process 18 clears all of the previously stored original calibration values (block 82) and proceeds to block 54 where the system is re-calibrated. The assumption is that the deflation has been corrected (via installing new, properly inflated tires, or via properly inflating the existing tires), and that new calibration values are necessary in light of the corrected deflation. As described above, this assumption is not always correct, especially in the case where the warning was issued erroneously. If the warning was erroneously generated due to some atypical vehicle operation, the prior art system 10 has no way of modifying its behavior to avoid future inconvenience to the driver.

While the prior art deflation detection system 10 may not be illustrative of every prior art system, at least some aspects, namely the generation of some form of final deflation signal, the operation of the reset button to reset the system after a warning has been issued (block 42), the subsequent clearing of the original calibration values (block 82) prior to re-calibration, and the absence of any feedback or correction to the deflation detection process 30 after system reset, are largely universal. As described above, failing to provide any feedback or correction to the deflation detection process after reset makes the prior art system 10 an open-loop system that is susceptible to repeatedly issuing the same erroneous tire deflation warnings.

It should be noted that some prior art evaluation processes (not shown) do not include a calibration process (hereinafter referred to as non-calibration prior art systems). In these non-calibration prior art systems, the evaluation process is designed to be immune to errors or inconsistencies caused by actual tire properties or operating characteristics, such that no calibration is required. These non-calibration prior art systems may or may not require a reset button. If a reset button is used, it functions mainly to turn off the warning signal in the passenger compartment. If no reset button is used, the warning signal should turn off automatically after the actual or perceived deflation has been corrected, resulting in an automatic, non-driver-activated reset. In either case, these non-calibration prior art systems do not provide any feedback or correction to the deflation detection process 30 after the system is reset.

Figure 3:
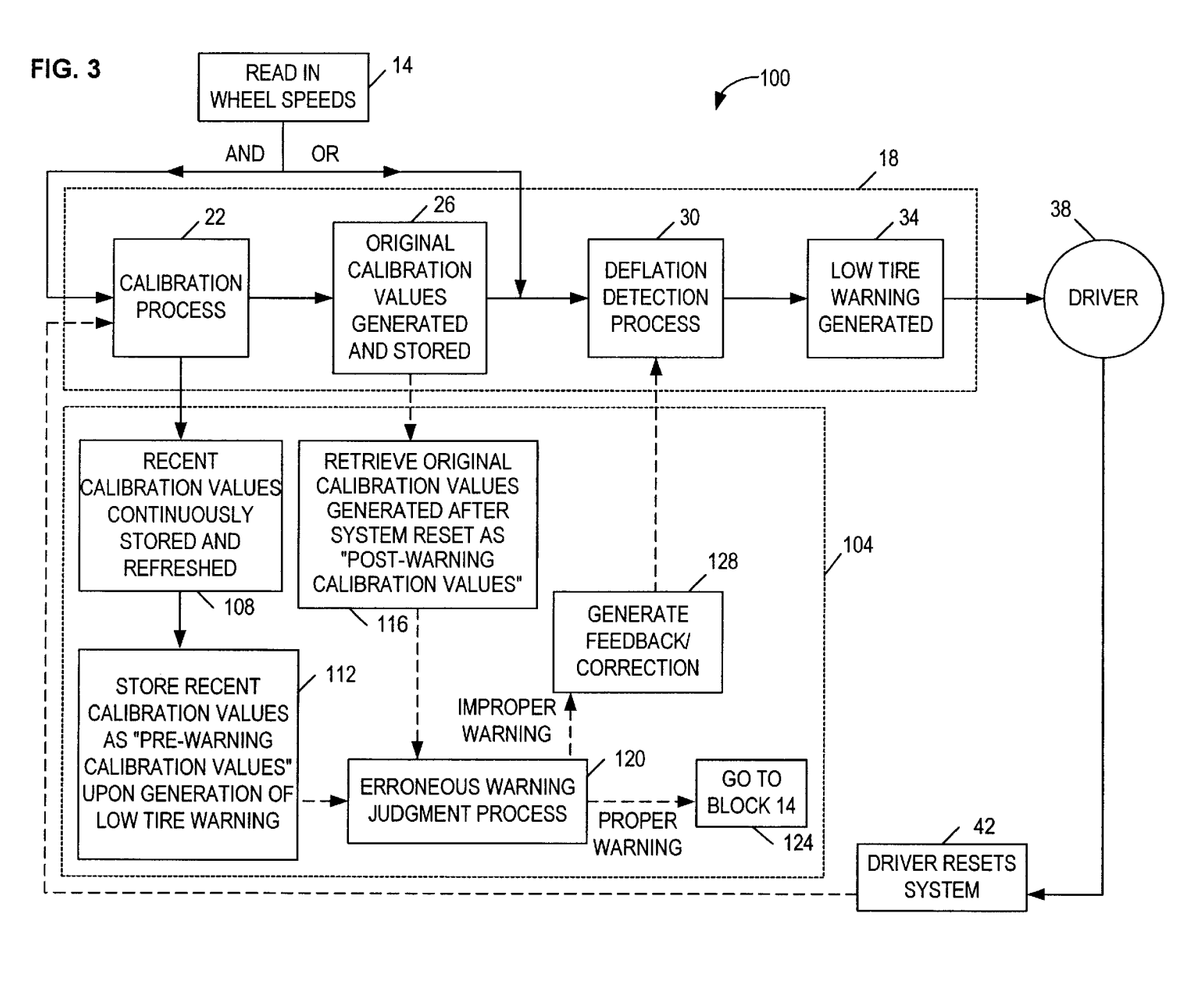
FIG. 3 is a flow chart representing the preferred tire deflation detection system embodying the present invention.

FIG. 3 illustrates a flow chart depicting the general operation of the preferred tire deflation detection system 100 embodying the present invention. The deflation detection system 100 is a closed-loop system that is capable of judging whether a deflation warning was erroneously issued, and providing feedback in the form of corrections to the deflation detection process 30, to substantially prevent the repeated issuance of erroneous warning. If it is determined that a warning was issued erroneously, the driver is judged to be using the vehicle in an atypical manner and the system 100 takes action to accommodate for future atypical usage. As shown in FIG. 3, the deflation detection system 100 is capable of operating with substantially any new or prior art deflation detection evaluation process 18 described above with respect to the detection system 10. This is because the feedback component of the system 100 operates independently of the specific evaluation process 18 and only utilizes information that all deflation detection evaluation processes have in common. Like actions have been given like reference numerals.

The detection system 100 also includes an inferred feedback component, generally represented by the box 104. The inferred feedback component 104 communicates with the evaluation process 18 to create a closed-loop system, and can be added on to existing deflation detection systems 10, or can be integrally designed with a deflation detection evaluation process 18 to produce the detection system 100. No additional hardware is necessary to support the inferred feedback component 104.

Unlike the prior art system 10, which bypasses the calibration blocks 22 and 26 after the original calibration values are generated and stored, the system 100 keeps the calibration process 22 continuously active (as indicated by the AND between blocks 14 and 22) to continuously generate calibration values. The recent calibration values that are not used by the deflation detection process 30 (which only uses original calibration values) are stored and refreshed (Block 108) by the inferred feedback component 104. After a low tire warning is generated (block 34), the recent calibration values generated just prior to the warning, or anytime during the pendency of the warning, are stored by the inferred feedback component 104 as "pre-warning calibration values" (block 112). These pre-warning calibration values reflect the current tire characteristics at the time of the warning.

Just as with the prior art system 10, the driver 38 will eventually reset the system 100 (block 42) after a warning has been issued and treated. The dashed leader lines in FIG. 3 represent actions taken after the system has been reset in block 42. After system reset, the system 100 returns to the calibration process 22 where re-calibration occurs and new, "original" calibration values for use with the deflation detection process 30 are generated (block 26). These original calibration values, which are newly generated after the warning has been issued and the system has been reset, reflect the current tire characteristics after system reset. The newly-generated original calibration values are then retrieved as "post-warning calibration values" (block 116).

Next, the inferred feedback component 104 proceeds to an erroneous warning judgment process (block 120), wherein the post-warning calibration values from block 116 are compared to the pre-warning calibration values from block 112. Generally speaking, if the post-warning calibration values are different than the pre-warning calibration values, the issued warning was likely a proper warning, indicating that a tire was actually deflated. Recall that the calibration values account for actual tire characteristics. Therefore, the difference in post-warning and pre-warning calibration values is evidence that the tire characteristics changed between the issuance of the warning and the re-calibration of the system 100 after reset. Presumably, the change in tire characteristics resulted from action taken by the driver 38 to correct the deflated tire. If the erroneous warning judgment process 120 determines that the warning was proper, the system 100 returns to block 14 and continues monitoring for likely tire deflations (block 124).

If, on the other hand, the erroneous warning judgment process 120 determines that the post-warning calibration values are substantially the same as the pre-warning calibration values, the warning was either completely disregarded by the driver 38 or was investigated and deemed to be erroneous by the driver 38 or a passenger. The similarity between the post-warning and pre-warning calibration values is evidence that the tire characteristics did not change between the issuance of the warning and the re-calibration of the system 100 after reset.

After determining that the post-warning and pre-warning calibration values are substantially the same, the erroneous warning judgment process 120 can use a number of different methods, which will be described in more detail below, to determine whether the driver 38 or a passenger actually investigated the warning and determined the warning to be improper. If the erroneous warning judgment process 120 determines, based on the perceived actions of the driver 38 or a passenger, that the warning was improper, feedback in the form of a correction is generated and supplied to the deflation detection process 30 (block 128) to substantially reduce or eliminate the recurrence of erroneous warnings in the future. The specific corrections that are made to the deflation detection process 30 will depend on the specific deflation detection process being used, but will be generally described below.

Figure 4:
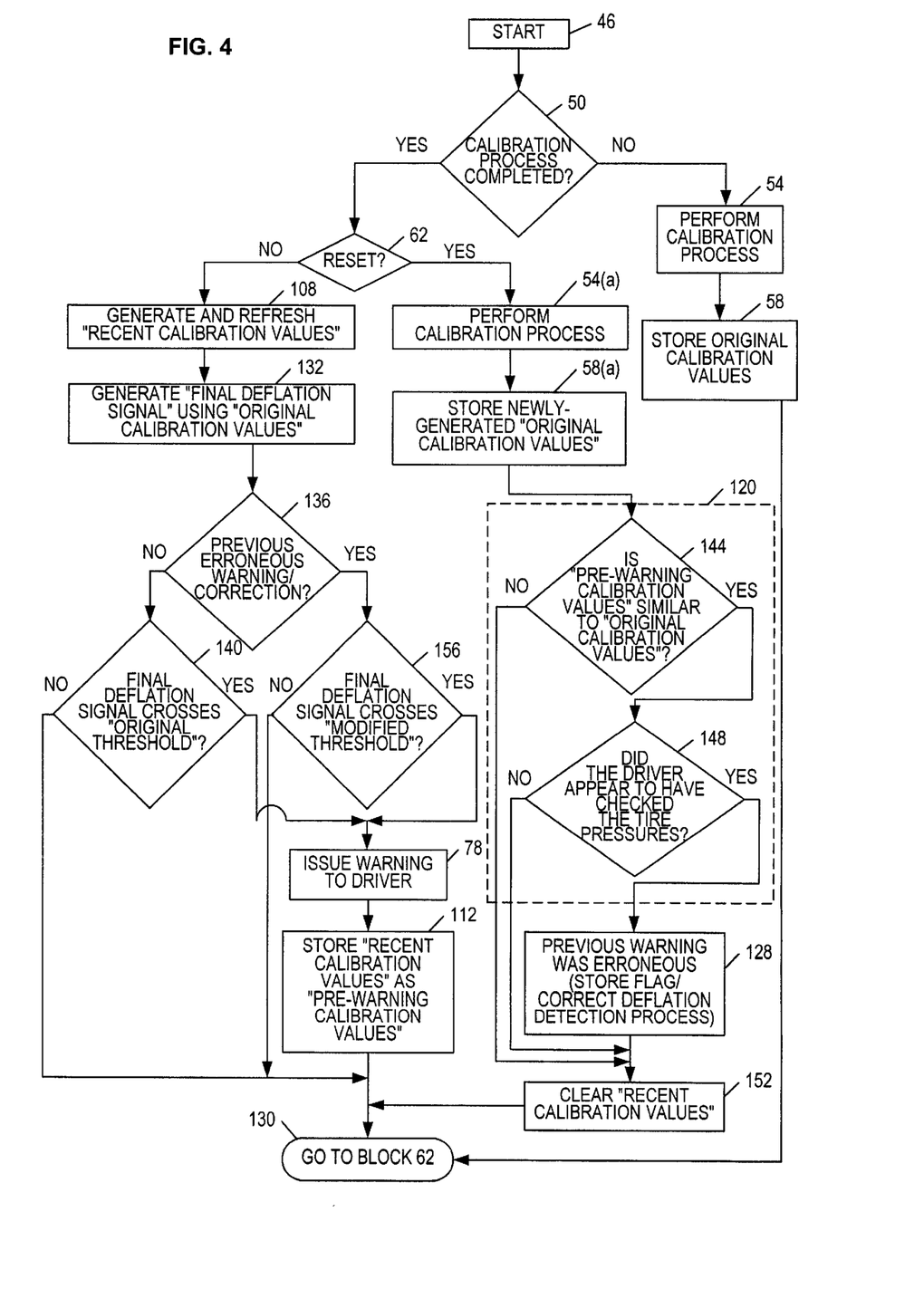
FIG. 4 is a flow chart illustrating in more detail the deflation detection system of FIG. 3.

FIG. 4 illustrates the interaction between the evaluation process 18 and the inferred feedback component 104 in greater detail. Like actions have been given like reference numerals. With the wheel speed values read in (see block 14 in FIG. 3), the evaluation process 18 and the inferred feedback component 104 are ready to start (block 46). First, the evaluation process 18 checks to see whether the calibration process 22 has been completed (block 50). If the calibration process 22 has been completed, the evaluation process 18 proceeds to block 62 as will be further described below. If the calibration process 22 has not yet been completed, the evaluation process 18 proceeds to perform the calibration process 22 (block 54). With the calibration process 22 complete, the evaluation process 18 stores the original calibration values (block 58) for use in the deflation detection process 30 and proceeds to block 62 (block 130).

At block 62, the evaluation process 18 asks whether the system 100 has been reset. Unlike the prior art system 10, when the system 100 has not been reset, the calibration process continues to operate, thereby generating and refreshing recent calibration values (block 108). Next, the evaluation process 18 proceeds to generate a final deflation signal using the original calibration values (block 132). The evaluation process 18 then asks whether any corrections have been made to the deflation detection process 30 in light of any previous erroneous warnings (block 136). If there are corrections from a previous erroneous warning ("YES" in block 136), the evaluation process proceeds to block 156 as will be further described below. If there has not been a previous erroneous warning, the deflation detection process 30 determines whether the final deflation signal crosses the original predetermined threshold value (block 140), which would indicate whether or not a tire is likely to be deflated. If no deflation is likely ("NO" in block 140), the evaluation process 18 proceeds to block 62 (block 130) and continues monitoring for likely deflations. If a deflation is likely ("YES" at block 140), the evaluation process 18 issues a warning to the driver (block 78), stores the recent calibration values as "pre-warning calibration values" (block 112), and returns to block 62 (block 130).

As stated above, prior to resetting the system 100 the driver 38 or a passenger may have ignored the warning (either intentionally or accidentally), may have investigated the warning, found an actual deflated tire, and corrected the problem, or may have investigated the warning and found no actual deflated tire. When the evaluation process 18 asks whether the system 100 has been reset (block 62), and the answer is "YES," the evaluation process 18 performs the calibration process 54 once again (block 54*a*) to re-calibrate the system 100 after the reset. The newly-generated original calibration values are stored (block 58*a*) for use in both the deflation detection process 30 and the erroneous warning judgment process 120. As described above with respect to block 116, the newly-generated original calibrations values used in the erroneous warning judgment process 120 will be referred to as post-warning calibration values. Blocks 144 and 148 function together as the erroneous warning judgment process 120. In block 144, the system 100 determines whether the pre-warning calibration values from block 112 are similar to the post-warning calibration values from block 58*a*. If the pre-warning and post-warning calibration values are not similar, the warning was likely proper and resulted in corrective action by the driver 38. The recent calibration values are cleared (block 152) and the system 100 returns to block 62 for continued monitoring.

If the pre-warning and post-warning calibration values are similar, the system 100 proceeds to block 148 to determine whether the driver 38 ignored the warning, or whether the driver 38 or a passenger (hereinafter collectively referred to simply as the driver) investigated the warning and found no actual deflation.

More specifically, block 148 asks whether the driver of the vehicle appeared to have checked the tire pressures prior to resetting the system. There are numerous ways in which the erroneous warning judgment process 120 can determine whether the driver 38 acknowledged the warning and took action to check the tire pressures without any direct feedback from the driver 38.

For example, the erroneous judgment process 120 can check whether the vehicle came to a complete stop, the transmission was shifted into park (for automatic transmission vehicles), and a certain amount of time elapsed (i.e., 30 seconds, 60 seconds, etc.) prior to system reset (indicating the driver stopped the vehicle to inspect the tires). For manual transmission vehicles, the erroneous judgment process 120 can check whether the vehicle came to a complete stop, the parking brake was set, and a certain amount of time elapsed (i.e., 30 seconds, 60 seconds, etc.) prior to system reset (indicating the driver stopped the vehicle to inspect the tires).

Other checks include whether the ignition was turned off prior to reset (indicating the driver turned off the vehicle to inspect the tires), whether a driver's or passenger's door was opened and remained open for a certain amount of time before being closed prior to reset (indicating the driver or passenger opened the door and left it open while checking the tires), whether the driver's or passenger's door was opened and closed, and opened and closed again after a certain amount of time had passed prior to reset (indicating the driver or passenger opened and closed the door to get out of the vehicle, checked the tires, and then opened and closed the door to get back into the vehicle), and the like.

Any of these various methods for block 148 are made possible due to the Local Area Network (LAN) that is commonly used on most modern vehicles. The various vehicle computer systems, including the anti-lock braking system (through which the tire deflation detection system 100 operates), the engine computer, the transmission computer, the body computers (which control door lights, door locks, climate control, etc.), and any other vehicle computer systems each communicate with the LAN and can therefore communicate with each other via the LAN. Virtually any signal or signals available via the LAN can be used in block 148 to determine whether the driver has taken action to check the tire pressures prior to resetting the system.

If the answer to block 148 is "NO," the system 100 determines that the driver ignored the warning and proceeds to block 152 and on to block 130 for continued monitoring. If the answer to block 148 is "YES," the erroneous warning judgment process 120 determines that the warning was erroneous and stores a flag in, and makes a modification or correction to the deflation detection process 30 (block 128).

The correction can involve modifying the deflation detection process 30 to change the original predetermined deflation signal threshold to a modified deflation signal threshold, thereby requiring a different perceived deflation level prior to issuing a warning (i.e., lessening the sensitivity of the system 100). In other words, the predetermined deflation signal threshold is modified such that final deflation signals calculated with either the pre-warning calibration values or the post-warning calibration values will represent normal or acceptable tire inflation levels. Alternatively, the correction can involve modifying or correcting the final deflation signals generated by the deflation detection process 30. It is clear that correcting either one of the final deflation signal or the original threshold accomplishes the same goal.

The system then proceeds to block 152 where the recent calibration values are cleared before returning to block 62 (block 130). When the deflation detection process 30 reaches block 136 the next time, the flag/correction created by block 128 is recognized in block 136 and the deflation detection process 30 compares the final deflation detection signal to the modified threshold (block 156) to determine whether a tire is likely to be deflated. If a correction was made to the final deflation signals, these corrected final deflation signals are compared to the original threshold.

This feedback and correction allows the system 100 to substantially reduce or eliminate the recurrence of erroneous warnings, which tend to annoy the driver. The system 100 can continue working in this manner by using and updating the modified threshold or the final deflation signals, and can also be reset to return to the original predetermined threshold or the original final deflation signals. Resetting the system can take place after a predetermined number of miles have been traveled, a predetermined number of ignition cycles have occurred, or any other suitable measure of time has passed.

The feedback component 104 is also capable of working with non-calibration prior art deflation detection systems with only minor changes. Generally speaking, the storage and comparison of calibration values is replaced by the storage and comparison of final deflation signals, both of which can be designated generally as "results" of the evaluation process 18. For example, block 108 would store and refresh recent final deflation signals generated by the deflation detection process 30. When a warning is issued, block 112 would store the recent final deflation signal as a "pre-warning final deflation signal." After reset, block 116 would retrieve an original final deflation signal generated after reset as a "post-warning final deflation signal." Block 120 would then compare the pre-warning final deflation signal to the post-warning final deflation signal to determine whether the warning was likely to be erroneous.

Just as with the calibration values, the pre-warning and post-warning final deflation signals should be substantially different if corrective action was taken to remedy an actual deflated tire. If the pre-warning and post-warning final deflation signals are similar, the system can proceed as described above to determine whether the warning was simply ignored, or whether the warning was erroneous. If the warning was erroneous, corrective action can be taken in the same manner as described above.

Figure 5:
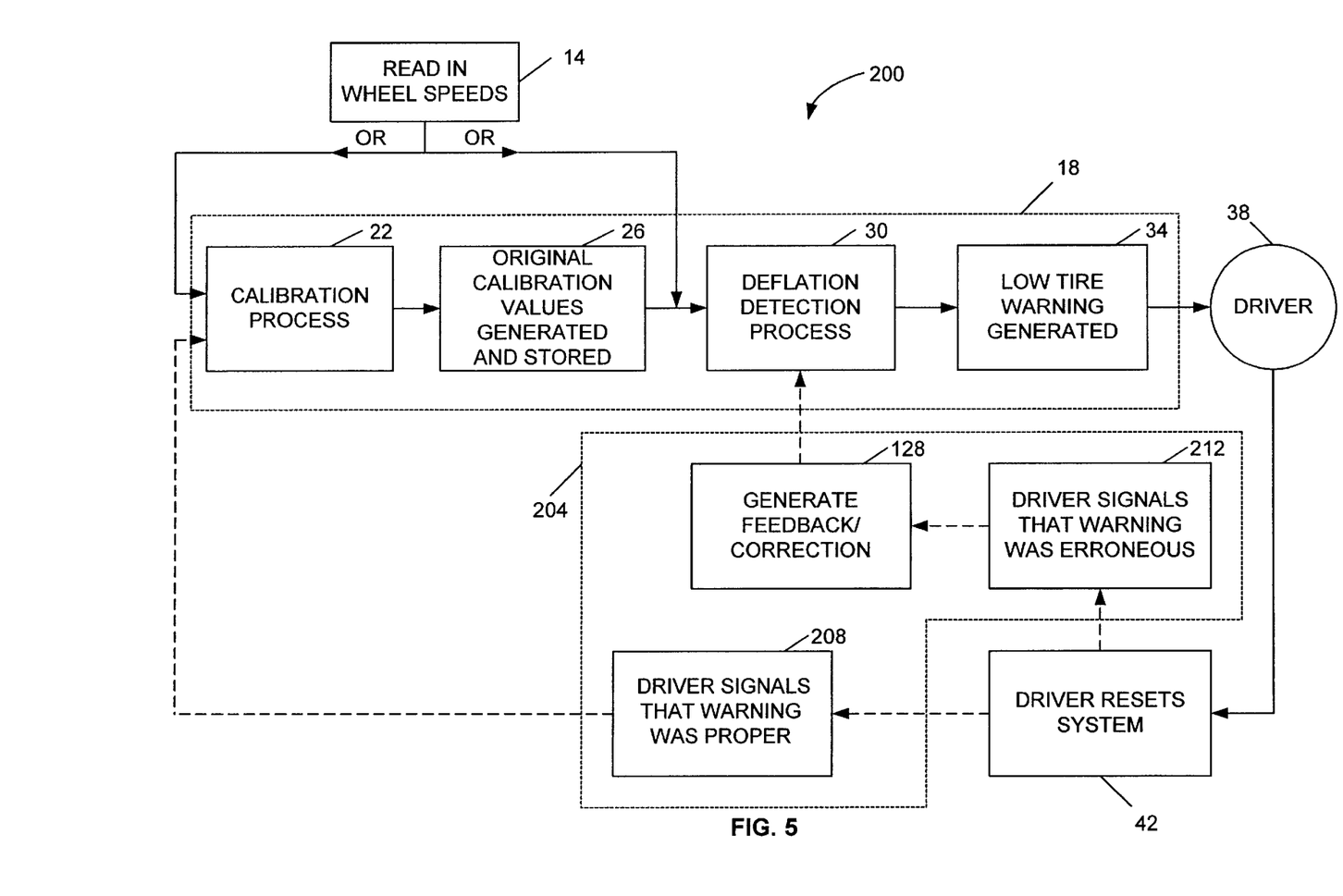
FIG. 5 is a flow chart representing an alternative tire deflation detection system embodying the present invention.

FIG. 5 illustrates a flow chart depicting the general operation of an alternative tire deflation detection system 200 embodying the present invention. Like actions have been given like reference numerals. The deflation detection system 200 is a closed-loop system having a direct feedback component, generally represented by the box 204. Rather than inferring driver feedback like the inferred feedback component 104, the direct feedback component 204 obtains feedback directly from the driver 38 by way of signals generated by the driver 38 which indicate whether the warning was proper (block 208) or erroneous (block 112). The signals can be generated in a similar manner to the generation of the reset signal, using buttons, switches, or any other suitable triggering devices.

In the system 200 shown in FIG. 5, the driver 38 provides direct feedback after the issuance of a warning. If the driver 38 determines that the warning was proper, he provides feedback by signaling the proper warning (block 208). The system 200 then re-calibrates (block 22) and continues monitoring. If the driver 38 checks the tires and determines that the warning was improper, he signals an erroneous warning (block 212), which triggers the generation of the feedback and correction (block 128) in the same fashion as described above for system 100. The system 200 then continues monitoring.

Figure 6:
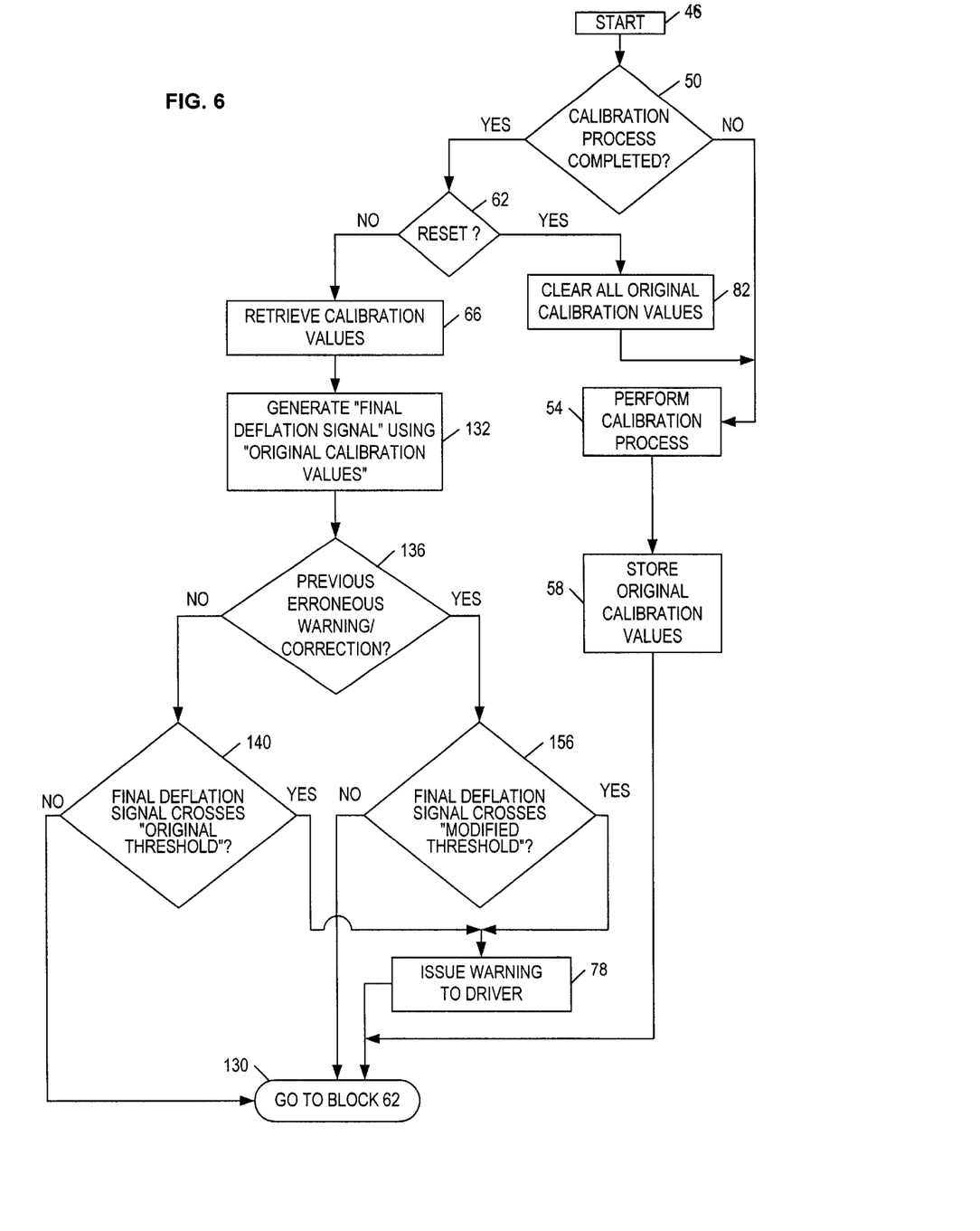
FIG. 6 is a flow chart illustrating in more detail the deflation detection system of FIG. 5.

FIG. 6 illustrates the interaction between the evaluation process 18 and the direct feedback component 204 in greater detail. Like actions have been given like reference numerals. FIG. 6 is substantially similar to the prior art system 10 illustrated in FIG. 2, but includes some of the blocks illustrated in FIG. 4. More specifically, after retrieving the calibration values in block 66, the system 200 generates final deflation signals using the original calibration values (block 132) and then asks whether a previous erroneous warning/correction has been stored in the evaluation process 30 (block 136). Recall that in the system 200, such a correction is generated after the driver directly signals that a previous warning was erroneous. If no previous erroneous warning has been issued, the system 200 proceeds to block 140 as described above with respect to FIG. 4. If a previous erroneous warning was issued, the system 200 proceeds to block 156 as described above with respect to FIG. 4. Unlike the system 100 however, the system 200 does not include block 1 12 because there is no comparison of pre-warning values and post-warning values in the system 200. The need for such a comparison is eliminated due to the direct feedback provided by the driver 38.

Just as with the inferred feedback component 104 of the system 100, the direct feedback component 204 of the system 200 can be added on to existing tire deflation detection systems, or can be an integral feature of a new system. Like the inferred feedback component 104, the direct feedback component 204 can be used with any known evaluation process 18, including those that do not undergo calibration.

While this alternative embodiment with direct feedback can be useful in reducing the number of erroneous warnings issued, it is not as preferable as the inferred feedback embodiment. First, the direct feedback component 204 requires additional direct action on behalf of the driver, namely signaling "proper" or "erroneous" to the detection system after every warning, in addition to resetting the system. Not only is this somewhat inconvenient for the driver, but it exposes the tire deflation detection system to potential signaling errors made by the driver (i.e. selecting the wrong button, pressing both buttons, failing to depress either button, etc.).

Second, the direct feedback component 204 requires the driver to subjectively evaluate whether or not a tire is actually deflated, perhaps with nothing more than a visual inspection. While this may be an easy task in the case of an extremely deflated tire, the twenty to thirty percent deflation status normally used as the threshold in most tire deflation detection systems will be more difficult for the driver to evaluate. Finally, the direct feedback system 200 will require additional hardware, namely buttons and wiring, which will need to be designed, manufactured, and installed, thereby adding additional cost to the consumer.

Despite all of the advantages of the inferred feedback system 100, the direct feedback system 200 of the present invention nonetheless offers an improvement over prior art deflation detection systems that have no feedback capability at all.

Various features of the invention are set forth in the following claims.

What is claimed is:

1. A system for detecting a deflated tire on a vehicle, the system comprising:

an evaluating process that determines when a tire is likely to be deflated and issues a warning when the evaluating process determines a tire is likely to be deflated; and a feedback component that provides feedback to the evaluating process indicating whether the issued warning was erroneous.

2. The deflation detection system of claim 1, wherein the feedback component makes corrections to the evaluating process.

3. The deflation detection system of claim 1, wherein the feedback component is a direct feedback component.

4. The deflation detection system of claim 3, wherein the direct feedback component includes signals directly generated by a driver of the vehicle after the warning has been issued.

5. The deflation detection system of claim 1, wherein the feedback component is an inferred feedback component.

6. The deflation detection system of claim 5, further including a reset button that resets the evaluation process after a warning has been issued, and wherein the inferred feedback component compares a result of the evaluating process generated prior to the issuance of the warning to a result of the evaluating process generated after reset.

7. The deflation detection system of claim 5, wherein the inferred feedback component determines whether a driver of the vehicle has taken action to check a tire.

8. The deflation detection system of claim 5, wherein the inferred feedback component is coupled to a local area network of the vehicle.

9. A method of reducing the number of erroneous warnings issued from a tire deflation detection system-on a-vehicle, the tire deflation detection system having an evaluation process capable of evaluating wheel speed data to determine whether a tire is likely to be deflated, and issuing a warning to a driver of the vehicle when the system determines a tire is likely to be deflated, the method comprising:

resetting the system after a warning has been issued;

continuing the evaluation process after the system is reset; and comparing a result of the evaluation process generated prior to the issuance of the warning to a result of the evaluation process generated after the system is reset to determine whether the warning was improper.

10. The method of claim 9, further including determining whether action other than resetting was taken by the driver of the vehicle after the warning was issued.

11. The method of claim 9, further including making a correction to the evaluation process if the system determines the warning was improper.

12. The method of claim 9, wherein resetting the system is performed by the driver.

13. A method of detecting a deflated tire on a vehicle with a tire deflation detection system, the method comprising:

measuring a wheel speed of a wheel on the vehicle a plurality of times;

evaluating the wheel speeds to determine whether a tire is likely to be deflated;

issuing a warning when the system determines a tire is likely to be deflated; and determining whether the warning was improper.

14. The deflation detection method of claim 13, wherein determining whether the warning was improper includes determining whether action was taken by a driver of the vehicle after the warning was issued.

15. The deflation detection method of claim 14, wherein determining whether the warning was improper includes determining whether action other than resetting the system was taken by a driver of the vehicle after the warning was issued.

16. The deflation detection method of claim 14, wherein determining whether action was taken by the driver includes determining whether the vehicle came to a complete stop after the warning was issued.

17. The deflation detection method of claim 14, wherein determining whether action was taken by the driver includes determining whether a door of the vehicle was opened after the warning was issued.

18. The deflation detection method of claim 14, wherein determining whether action was taken by the driver includes determining whether the transmission of the vehicle was shifted to the park position after the warning was issued.

19. The deflation detection method of claim 14, wherein determining whether action was taken by the driver includes determining whether the ignition of the vehicle was turned off after the warning was issued.

20. The deflation detection method of claim 14, wherein determining whether action was taken by the driver includes determining whether the emergency brake of the vehicle was set after the warning was issued.

21. The deflation detection method of claim 14, wherein determining whether action was taken by the driver includes determining whether a door of the vehicle was closed after the warning was issued.

22. The deflation detection method of claim 13, wherein determining whether the warning was improper includes:

resetting the evaluating process after the warning has been issued;

continuing the evaluating process after reset; and comparing a result of the evaluating process generated prior to the issuance of the warning to a result of the evaluating process generated after reset.

23. The deflation detection method of claim 13, wherein determining whether the warning was improper includes obtaining direct feedback from the driver regarding whether the warning was erroneously issued.

24. The deflation detection method of claim 13, further including making a correction to the evaluating process when the system determines the warning was improper.

25. The deflation detection method of claim 24, wherein the evaluating process includes a deflation detection process that generates signal values based on the wheel speeds, and wherein making a correction includes adjusting the signal values.

26. The deflation detection method of claim 24, wherein the evaluating process includes a deflation detection process that includes a predetermined threshold value, and wherein making a correction includes adjusting the predetermined threshold value.

* * * * *

UNITED STATES PATENT AND TRADEMARK OFFICE
CERTIFICATE OF CORRECTION

PATENT NO.     : 6,459,369 B1
DATED          : October 1, 2002
INVENTOR(S)    : Orson Szu-Han Wang It is certified that error appears in the above-identified patent and that said Letters Patent is hereby corrected as shown below:

Column 11,
Line 24, "system-on-a-vehicle" should be -- system on a vehicle --

Signed and Sealed this

Eighteenth Day of February, 2003

JAMES E. ROGAN
*Director of the United States Patent and Trademark Office*